United States Patent [19]

Geschwender

[11] Patent Number: 4,611,684

[45] Date of Patent: Sep. 16, 1986

[54] FRONT-WHEEL DRIVE MOTOR VEHICLE

[75] Inventor: Robert C. Geschwender, Lincoln, Nebr.

[73] Assignee: George W. Peterson, Lincoln, Nebr.; a part interest

[21] Appl. No.: 694,408

[22] Filed: Jan. 24, 1985

[51] Int. Cl.[4] .............................................. B62K 15/00
[52] U.S. Cl. ............................. 180/223; 280/87.04 A
[58] Field of Search ............... 180/223, 219, 278, 287, 180/87.04 R, 87.04 A, 11.2; 188/77

[56] References Cited

U.S. PATENT DOCUMENTS

| | | | |
|---|---|---|---|
| 1,192,514 | 7/1916 | Gibson | 180/223 |
| 1,192,515 | 7/1916 | Gibson | 180/223 |
| 1,763,183 | 6/1930 | Roe | 280/296 |
| 3,295,863 | 1/1967 | Jaulmes | 280/278 |
| 3,354,975 | 11/1967 | Stuart | 280/278 |
| 3,486,765 | 12/1969 | Turner | 280/278 |
| 3,625,079 | 12/1971 | Hoft | 180/231 |
| 3,828,895 | 8/1974 | Boaz | 188/77 R |
| 4,026,573 | 5/1977 | Richardson | 280/278 |
| 4,037,852 | 7/1977 | Bayer et al. | 280/87.04 R |

Primary Examiner—John J. Love
Assistant Examiner—Donn McGiehan
Attorney, Agent, or Firm—Senniger, Powers, Leavitt and Roedel

[57] ABSTRACT

A front-wheel drive motor vehicle comprising a front frame assembly including a front frame extending up at the front of the vehicle, a front wheel mounted at the lower end of the front frame, and handle bars at the upper end of the front frame, a power drive assembly mounted on the front frame for driving the front wheel to power the vehicle, and a rear frame assembly including a rear frame extending rearwardly from the front frame, a rear wheel mounted at the rearward end of the rear frame, and a stand-up rider's platform on the rear frame forward of the rear wheel at an elevation and position designed to permit a rider to stand on the platform while grasping the handle bars.

26 Claims, 12 Drawing Figures

FRONT-WHEEL DRIVE MOTOR VEHICLE

BACKGROUND OF THE INVENTION

This invention relates generally to motor vehicles and, more particularly, to a lightweight stand-up scooter-type motor vehicle which is intended primarily for off-road use.

U.S. Pat. Nos. 1,192,514, 1,192,515, 1,763,183, 3,354,975 and 4,206,573 disclose various motor vehicles generally relevant to the present invention.

SUMMARY OF THE INVENTION

Among the several objects of this invention may be noted the provision of a lightweight motor vehicle of the aforementioned type which is ideal for off-road transportation and recreation; the provision of such a vehicle which is designed to permit the rider to ride close to the ground in a natural standing position; the provision of such a vehicle which is easy and safe to operate; the provision of such a vehicle which is of knock-down construction for convenient transport and storage; and the provision of such a vehicle which is durable for longer life, fun to ride, inexpensive to manufacture and economical to operate.

Generally, a motor vehicle of the present invention is a front-wheel drive vehicle comprising a front frame assembly including a front frame extending up at the front of the vehicle, a front wheel mounted at the lower end of the front frame, and steering means at the upper end of the front frame, a power drive assembly mounted on the front frame for driving the front wheel to power the vehicle, and a rear frame assembly including a rear frame extending rearwardly from the front frame, a rear wheel mounted at the rearward end of the rear frame, a rider's platform on the rear frame forward of the rear wheel at an elevation and position adapted to permit a rider to stand on the platform while grasping said steering means, the platform being mounted for pivoting on the rear frame about a generally horizontal axis extending generally transversely with respect to the rear frame, and a brake for the rear wheel adapted to be actuated by pivoting the platform about said axis in one direction, the platform being pivotable in the opposite direction to disengage the brake.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figures 1, 2:
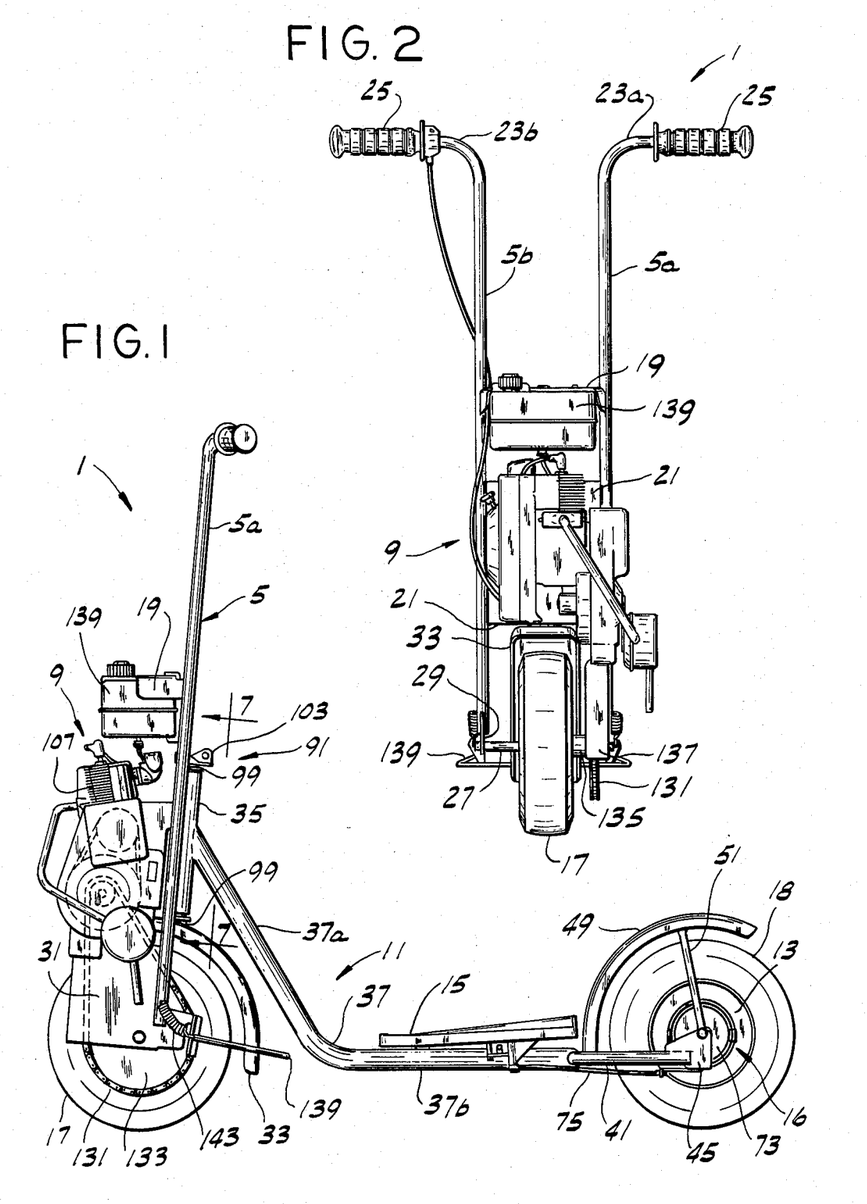
FIG. 1 is a left a side elevation of a scooter-type motor vehicle of the present invention.
FIG. 2 is a front elevation of FIG. 1.
Figures 3, 4:
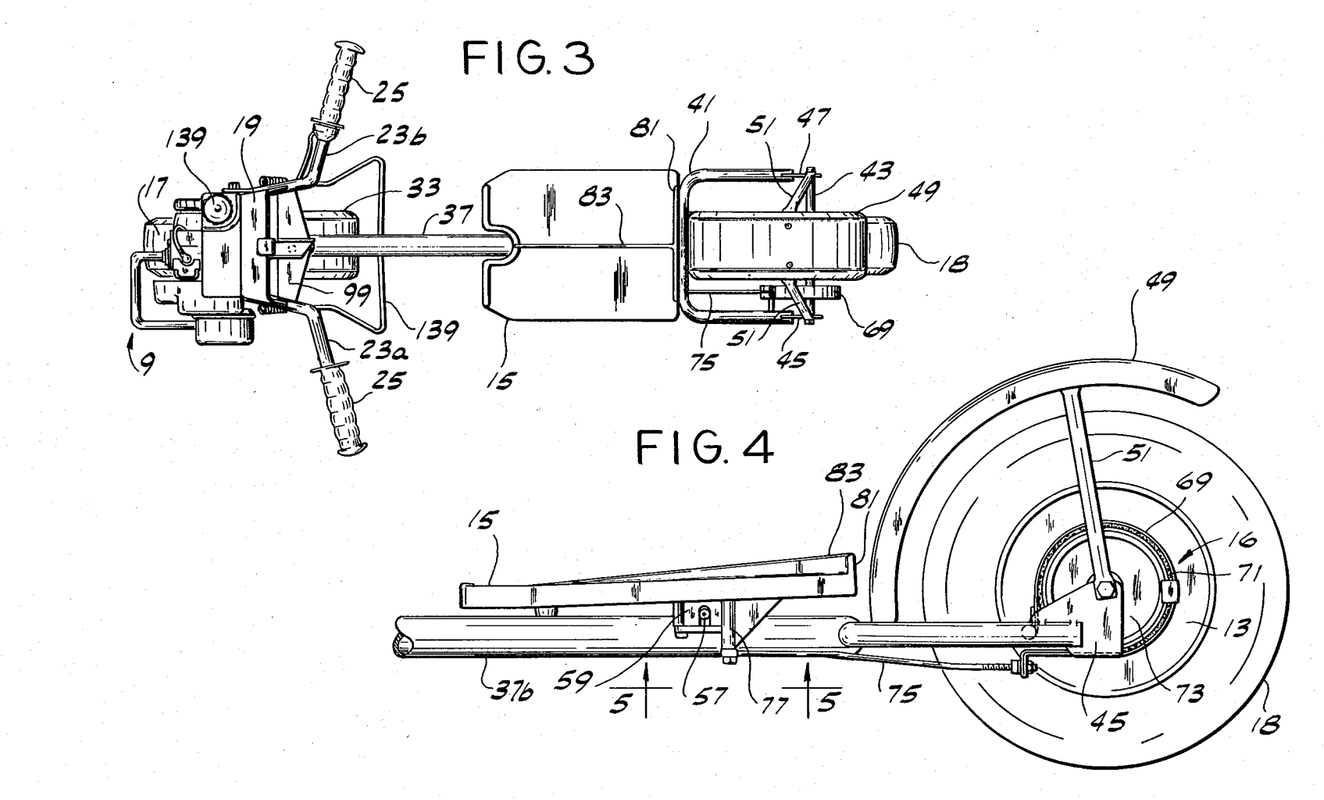
FIG. 3 is a plan view of FIG. 1.
FIG. 4 is an enlarged portion of FIG. 1 showing a brake of the vehicle.

Referring now to the drawings, particularly FIGS. 1–3, a front-wheel drive scooter-type motor vehicle of the present invention is indicated in its entirety by the reference numeral 1. As shown, it comprises a front frame assembly including a front frame generally designated 5 extending up at the front of the vehicle and a front wheel 7 mounted at the lower end of the front frame. A power drive assembly, generally designated 9, is mounted on the front frame 5 for driving the front wheel to power the vehicle and propel it forward. The vehicle also includes a rear frame assembly comprising a rear frame, generally designated 11, extending rearwardly from the front frame 5, a rear wheel 13 mounted at the rearward end of the rear frame, a rider's platform 15 mounted for pivoting on the rear frame about a generally horizontal axis extending generally transversely (side-to-side) with respect to the vehicle, and a brake generally indicated at 16 for the rear wheel adapted to be actuated by pivoting the platform about the aforesaid axis in one direction, the platform being pivotable in the opposite direction to disengage the brake. Relatively wide pneumatic tires 17, 18 having a tread suitable for off-road use are mounted on the front and rear wheels.

More specifically, the front frame 5 is a fork frame comprising a pair of upright generally parallel fork frame members 5a, 5b connected by upper and lower cross frame members 19 and 21, respectively. The fork frame members are preferably of tubular steel stock, the upper ends of the members being bent to extend laterally outwardly at opposite sides of the vehicle to form handle bars 23a, 23b for steering the vehicle. Hand grips 25 are provided at the outer ends of the handle bars. The front wheel 7 is rotatable on an axle 27 secured at its ends to mounting plates 29, 31 affixed (e.g., welded) to the lower ends of the fork frame members 5a, 5b in generally parallel planes extending in front-to-back direction with respect to the vehicle. A front fender 33 of suitably lightweight yet durable material (e.g., plastic) is secured to the lower cross frame member 21 and extends down at the rear of the front wheel 7 and tire 7 for protecting the rider.

The rear frame 11 comprises a generally vertical post 35 of tubular bar stock at the front of the rear frame, a rear frame member 37 of bent tubular metal having a first reach 37a sloping rearwardly and downwardly from the front post and a second reach 37b extending generally horizontally rearwardly toward the rear wheel 13, and a U-shaped yoke member 41 at the rearward end of the rear frame member. The rear wheel 13 is rotatably mounted on a rear axle 43 secured at its ends to mounting plates 45, 47 affixed, as by welding, to the arms of the yoke member (see FIG. 3). A rear fender 49 is supported in its FIG. 1 position above the rear wheel by a pair of struts 51 extending up from mounting plates 45, 47. The fender is fastened at its lower front end to the yoke member by suitable means indicated at 53 in FIG. 5.

The rider's platform 15 is preferably a molded plastic generally rectangular part pivoted on a shaft 57 affixed (e.g., welded) crosswise with respect to the horizontal reach 37b of the rear frame member 37. As shown best in FIGS. 5 and 7, a saddle structure 59 integrally molded with the platform of the underside of the platform receives the ends of the shaft 57 for pivoting of the platform on the shaft. The platform 15 is held on the shaft 57 with the shaft in the saddle structure by retaining bars 61 fastened at their ends (via screws 63, for example) to cylindric posts 65 at opposite sides of the saddle structure. The platform is pivotable on the shaft 57 for actuating the brake 16, which comprises a brake band 69 and pad 71 fitted around a brake drum 73 on the rear wheel 13. One end of this band 69 is secured in fixed position with respect to the drum 73. The other end of the band is connected by means of a cable 75 to a post 77 extending down from the underside of the platform, the arrangement being such that applying downward pressure to the rearward end of the platform pivots the platform in one direction (clockwise as viewed in FIG. 4) to tighten the band to bring the brake pad 71 into friction engagement with the drum 73 so to brake the rear wheel. Pivoting the platform in the other direction loosens the band to disengage the brake.

Figure 6:
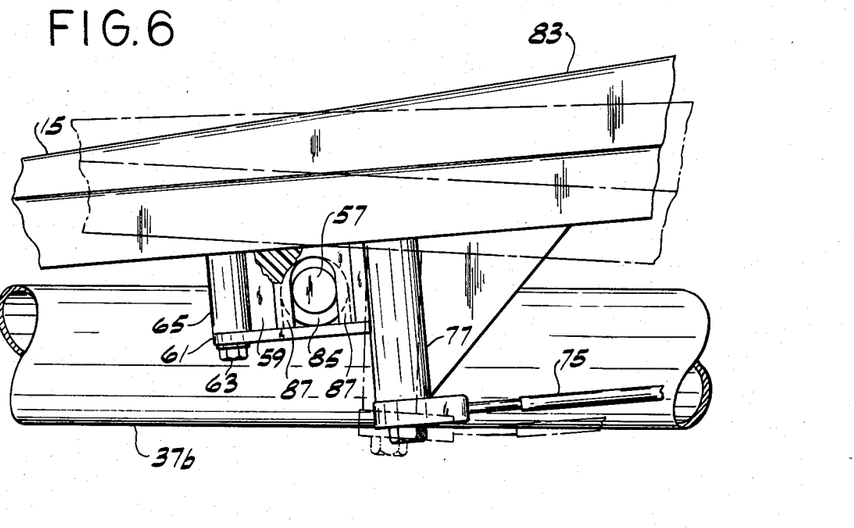
FIG. 6 is a view illustrating how the rider's platform is used to actuate the brake.

The platform has a pair of flanges on its upper surface, one (indicated at 81) extending across the back of the platform and the other (indicated at 83) extending forward from the back flange at the center of the platform. These flanges constitute means for properly locating a rider's feet on the platform and are so positioned that when a rider is standing on the platform with his feet on opposite sides of the center flange 83 and his heels adjacent the back flange 81, the arches of his feet are located generally directly above the pivot shaft 57, which is the preferred position for convenience in actuating the brake. Thus, when one or both feet are pivoted forward, the vehicle will roll freely, and when one or both feet are pivoted back, the brake is actuated. It will also be noted that since the brake 16 can be actuated by only one foot, the other foot may be used for balancing purposes. The direct attachment of the platform to the brake band also ensure fast response to the rider's actions.

Figure 5:
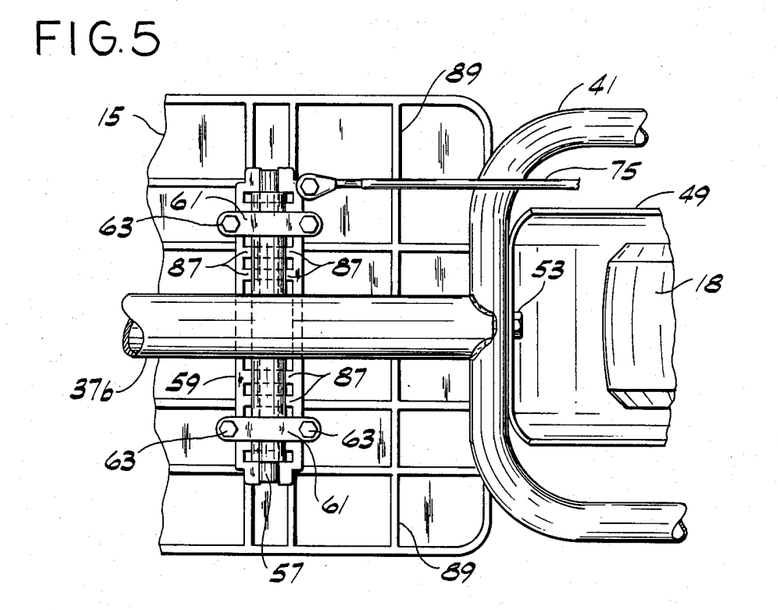
FIG. 5 is a view taken along line 5—5 of FIG. 4 showing a portion of the underside of the rider's platform.

To minimize any road vibration which might be felt by the rider, each end of the pivot shaft 57 has a bushing 85 (i.e., bushing means) thereon of resilient material such as rubber for cushioning the platform. The seat of the saddle structure 59 is ribbed, as indicated at 87, to allow deformation of the bushings into the spaces between the ribs to provide this cushioning effect. As illustrated in FIG. 5, the underside of the platform is provided with reinforcing ribs 89.

Figure 7:
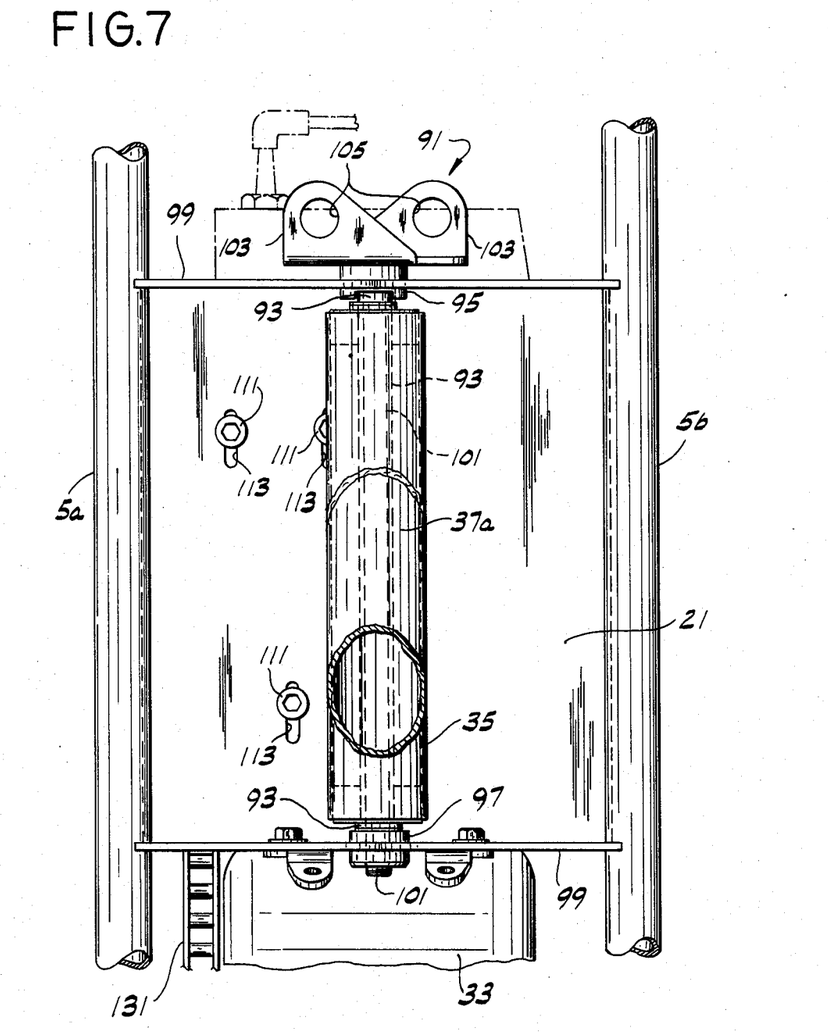
FIG. 7 is a vertical section along line 7—7 of FIG. 1 showing a release coupling detachably connecting the front and rear frame assemblies of the vehicle.
Figure 8:
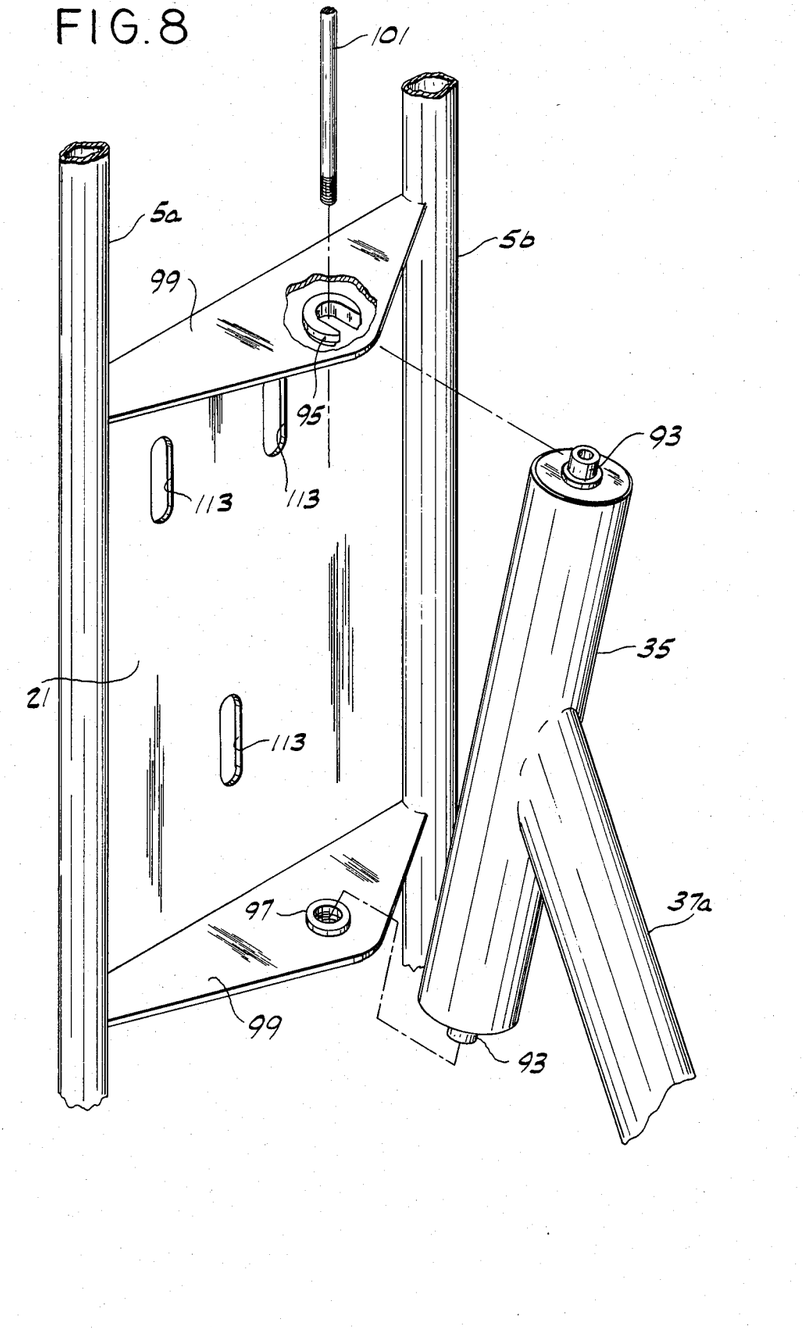
FIG. 8 is a view illustrating how the release coupling is used.

Indicated generally 91 in FIG. 7 is a quick-release coupling detachably connecting the front and rear frames 5, 11 and permitting the front frame to pivot relative to the rear frame for steering the vehicle. The coupling 91 comprises a spindle pin 93 suitably journalled in the front post 35 of the rear frame member 37. The ends of the spindle pin project axially beyond the post and are receivable in vertically spaced upper and lower retainers designated 95 and 97, respectively, on the lower cross frame member 21 of the front frame. As shown in FIG. 7, the upper and lower ends of the lower cross frame member 21 are bent to form generally horizontal rearwardly-extending flanges 99 which carry respective retainers 95 and 97. The lower retainer 97 is generally cup-shaped and the upper retainer 95 is generally U-shaped whereby the lower end of the spindle pin 93 may first be placed in the lower retainer and the other end then inserted into the U-shaped retainer, which opens rearwardly to permit entry of the spindle pin from the rear (see FIG. 8).

The coupling 91 also includes a lock pin 101 which is adapted to be inserted down through the upper retainer 95 (upper flange 99 has a hole through it), through an axial bore 102 in the spindle pin 93, and thence into the lower cup-shaped retainer 97. When in this position, the lock pin 101 detachably secures the spindle pin (and thus the rear frame 11) to the front frame 5 in a position wherein the ends of the spindle pin are in pivotal engagement with the retainers. For additional security, the lower end of the lock pin 101 is threadable into a tapped bore in the lower flange 99, which serves to lock the spindle pin is positioned. Finger grips 103 at the upper end of the lock pin 101 facilitate turning the pin to thread it down in the lower flange 99. A security cable (not shown) may be passed through openings 105 in these finger grips 102 to prevent the front and rear frames 5, 11 from being disconnected and stolen.

Figure 9:
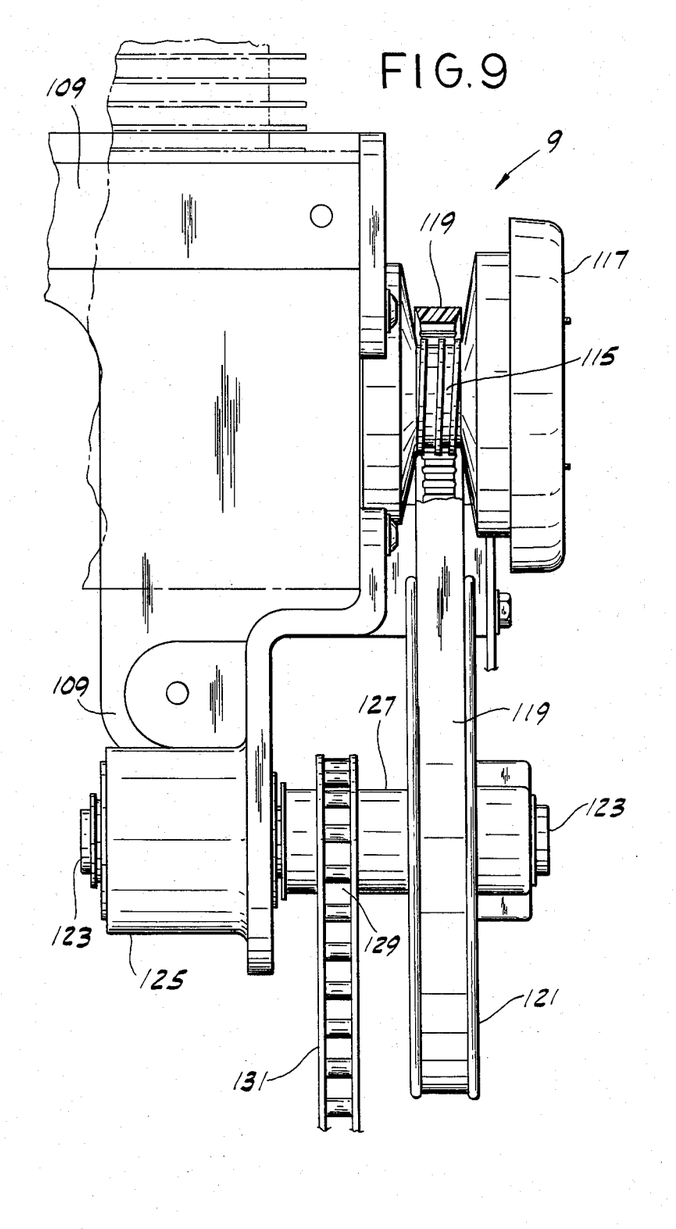
FIG. 9 is a front view of the power drive assembly showing portions of the engine (in phantom), the engine mount, clutches and various other drive components, portions being broken away to illustrate details.
Figure 10:
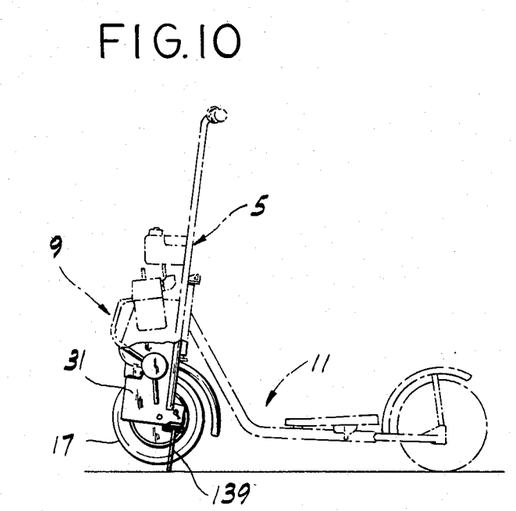
FIGS. 10 and 11 are views illustrating the operation of a kickstand in accordance with this invention.

The power drive assembly 9 comprises an engine 107 and a one-piece cast-metal engine mount 109, the latter of which is removably secured to the lower cross frame member 21 by bolts 111 extending through vertical slots 113 in the cross frame member to permit vertical adjustment of the engine relative to the front frame 5 (see FIG. 7). The engine may be a 2-cycle pull-start gasoline engine, for example, or an electric motor. As shown in FIG. 9, the engine has a rotary output shaft 115 driving a centrifugal clutch 117 which engages and disengages a belt drive 119 (i.e., the output of the clutch). The centrifugal clutch may be a standard centrifugal clutch, such as is commercially available from V-Plex Corporation of Enid, Okla., which disengages at low engine speeds and engages over some predetermined higher speed to drive belt 119. The belt drive is trained around a pulley 121 keyed to a jack shaft 123 journalled in a hub 125 cast as an integral part of the engine mount 109. A one-way clutch 127 transmits torsional force (and thus motion) in one direction from the jack shaft 123 to a sprocket 129 which drives a chain 131 trained around a sprocket 133 on the hub 135 (see FIG. 2) of the front wheel to propel the vehicle forward. In accordance with this invention, however, the one-way clutch 127 (which may be a drawn cup roller clutch of the type sold by Torrington Company of Torrington, Conn.) does not transmit torsional force in the opposite direction thereby to permit freewheeling of the front wheel 7, which is advantageously in that engine speed is allowed to drop when the vehicle is coasting downhill, for example. This arrangement also provides better balance due to the fact that there is no braking action by the engine during deacceleration. Moreover, the capability of the front wheel to free-wheel prevents lock-up of the front wheel in the unlikely event of engine seizure.

For safety reasons the front end of mounting plate 31 is bent to provide a guard 137 disposed immediately forward of drive chain 131. The speed of the engine is controlled by twisting the right hand grip 25 in conventional fashion. The fuel tank 139 for the engine is mounted directly above the engine on the upper cross frame member 19. A basket (not shown) may be mounted on the fork frame members 5a, 5b above the fuel tank if desired.

Figure 11:
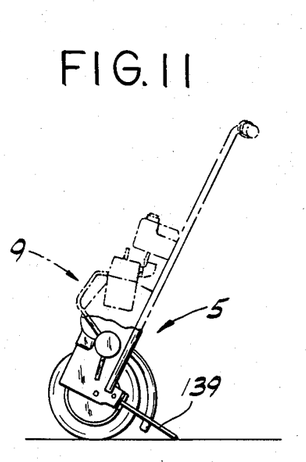
Figure 12:
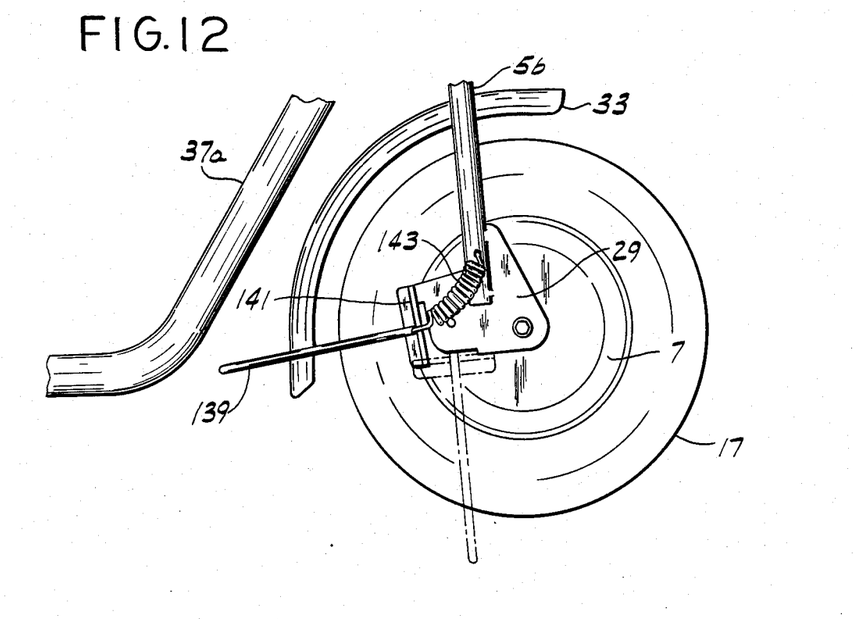
FIG. 12 is a right side elevation of the front wheel of the vehicle.

Indicated at 139 is a U-shaped kickstand, the ends of which are pivoted at 140 on the mounting plates 29, 31 rearward of and below the front fork frame members 5a, 5b for swinging between an up position (shown in solid lines in FIG. 12) when the vehicle is in use and a down position (shown in phantom lines FIG. 12) in which it adapted stably to support the vehicle in an upright position with the front tire 17 of the vehicle above the ground when the vehicle is parked and not in use. Thus, when parked, the vehicle may safely be started. It is a further feature of this invention that the kickstand, when in its up position, is designed stably to support the front frame 5 and power drive assembly 9 in an upright position when the front frame is detached from the rear frame 11, as illustrated in FIG. 11. Stops 141 on the pivoted ends of the kickstand are engageable with the rearward and bottom edges of the mounting plates 29, 31 for positively locating the kickstand 139 in its up and down positions, respectively. A pair of over-center springs 143 maintain the kickstand in these positions.

It will be apparent from the foregoing that the scooter-type vehicle 1 of the present invention is lightweight (preferably 60 pounds or less), safe and economical to operate, and easy to transport and store. In this latter regard, it will be observed that the coupling 91 is constructed so that the front and rear frame assemblies of the vehicle can be separated quickly and easily, especially in view of the fact that there are no interconnections other than coupling 91 between the front and rear frames 5 and 11. Moreover, the front frame assembly, rear frame assembly and power drive assembly are each designed to be within UPS shipping size and weight requirements, so that the entire vehicle may be shipped UPS in only three packages.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A front-wheel drive motor vehicle comprising a front frame assembly including a front frame extending up at the front of the vehicle, a front wheel mounted at the lower end of the front frame, and steering means at the upper end of the front frame, a power drive assembly mounted on the front frame for driving the front wheel to power the vehicle, and a rear frame assembly including a rear frame extending rearwardly from the front frame, a rear wheel mounted at the rearward end of the rear frame, a rider's platform on the rear frame forward of the rear wheel at an elevation and position adapted to permit a rider to stand on the platform while grasping said steering means, said platform being mounted for pivoting on the rear frame about a generally horizontal axis extending generally transversely with respect to the rear frame, and a brake for the rear wheel adapted to be actuated by pivoting said platform about said axis in one direction whereby a person standing on the rider's platform may actuate the brake by pivoting one foot without lifting the foot from the platform, the platform being pivotable in the opposite direction to disengage the brake.

2. A front-wheel drive motor vehicle as set forth in claim 1 wherein said brake is adapted to be actuated by applying downward pressure to the rearward end of said platform thereby to pivot the platform in said one direction.

3. A front-wheel drive motor vehicle as set forth in claim 2 further comprising means for locating a rider's feet on the platform in a position wherein the arches of the feet are generally above said pivot axis.

4. A front-wheel drive motor vehicle as set forth in claim 3 wherein said platform comprises a molded plastic part pivoted on a pivot shaft extending generally transversely with respect to the rear frame, said pivot shaft having resilient bushing means thereon for providing cushioning for the platform.

5. A front-wheel drive motor vehicle as set forth in claim 2 wherein said brake comprises a brake band fitted around a drum on said rear wheel, and means connecting the band to the platform, the arrangement being such that pivoting the platform in said one direction is adapted to tighten said band with respect to the drum thereby to brake the rear wheel.

6. A front-wheel drive motor vehicle as set forth in claim 2 further comprising a quick-release coupling detachably connecting the front and rear frames and permitting the front frame to be pivoted relative to the rear frame for steering the vehicle.

7. A front-wheel drive motor vehicle as set forth in claim 6 wherein said quick-release coupling comprises spindle means journalled in an upright position in the rear frame at the forward end thereof, and a lock pin for detachably securing said spindle means to the front frame in a position wherein the ends of said spindle means are in pivotal engagement with the front frame.

8. A front-wheel drive motor vehicle as set forth in claim 7 wherein said spindle means comprises a spindle pin having an axial bore therethrough, the ends of the spindle pin being receivable in vertically-spaced retainers on the front frame, said lock pin being adapted to be inserted through one retainer and said axial bore and into the other retainer for securing the spindle pin in position.

9. A front-wheel drive motor vehicle as set forth in claim 8 wherein one of said retainers is cup-shaped and the other is generally U-shaped whereby one end of the spindle may first be placed in said cup-shaped retainer and the other end then inserted into the U-shaped retainer.

10. A front-wheel drive motor vehicle as set forth in claim 9 wherein the lock pin is threadable into a threaded opening in the front frame for locking said spindle pin in position.

11. A front-wheel drive motor vehicle as set forth in claim 10 wherein said lock pin has finger grip means thereon to facilitate turning the lock pin, said finger grip means having at least on opening therein for receiving a security cable therethrough for preventing the lock pin from being unthreaded from said threaded opening.

12. A front-wheel drive motor vehicle as set forth in claim 8 wherein said front frame is a fork frame comprising a pair of upright generally parallel tubular fork frame members connected by a cross-frame member, said retainers being on said cross-frame member.

13. A front-wheel drive motor vehicle as set forth in claim 12 wherein said steering means comprises a pair of handle bars at the upper ends of the fork frame members, said fork frame members being bent to extend laterally outwardly on opposite sides of the vehicle to form said handle bars.

14. A front-wheel drive motor vehicle as set forth in claim 6 further comprising a kickstand pivoted at the lower end of the front frame for swinging between an up position when the vehicle is in use and a down position in which it is adapted stably to support the vehicle in an upright position when the vehicle is not in use, said kickstand in its up position being adapted stably to support the front frame assembly in an upright position when the front frame assembly is detached from the rear frame assembly.

15. A front-wheel drive motor vehicle as set forth in claim 1 wherein said power drive assembly comprises an engine, a first clutch driven by the output of the engine, a second clutch driven by the output of the first clutch, and drive means connecting the output of the second clutch and the front wheel of the vehicle, said second clutch being a one-way clutch adapted for transmitting a torsional force in one direction to drive the front wheel to propel the vehicle forward but not in the opposite direction thereby to permit freewheeling of the front wheel.

16. A front-wheel drive motor vehicle as set forth in claim 1 wherein said front and rear frames are formed from lengths of tubular metal, the overall weight of said vehicle being about 60 pounds or less.

17. A front-wheel drive motor vehicle as set forth in claim 16 wherein said front frame is a fork frame comprising a pair of generally parallel upright fork frame members of tubular metal having upper ends bent to extend laterally outwardly at opposite sides of the vehicle to form said steering means, said rear frame comprising a rear frame member of bent tubular metal having a first reach sloping rearwardly and downwardly from the front fork frame and a second reach extending generally horizontally rearwardly toward said rear wheel, said platform being pivoted on the generally horizontal reach.

18. A front-wheel drive motor vehicle comprising a front frame assembly including a front frame extending up at the front of the vehicle, a front wheel mounted at the lower end of the front frame, and steering means at the upper end of the front frame, a power drive assembly mounted on the front frame for driving the front wheel to power the vehicle, a rear frame assembly including a rear frame extending rearwardly from the front frame, a rear wheel mounted at the rearward end of the rear frame, and a rider's platform on the rear frame forward of the rear wheel at an elevation and position adapted to permit a rider to stand on the platform while grasping said steering means, and a quick-release coupling detachably connecting the front and rear frames and permitting the front frame to be pivoted relative to the rear frame for steering the vehicle, said coupling comprising spindle means journalled in an upright position in the rear frame at the forward end thereof, and a lock pin for detachably securing said spindle means to the front frame in a position wherein the ends of said spindle means are in pivotal engagement with the front frame, said spindle means comprising a spindle pin having an axial bore therethrough, the ends of the spindle pin being receivable in vertically-spaced retainers on the front frame, said lock pin being adapted to be inserted through one retainer and said axial bore and into the other retainer for securing the spindle pin in position.

19. A front-wheel drive motor vehicle as set forth in claim 18 wherein one of said retainers is cup-shaped and the other is generally U-shaped whereby one end of the spindle may first be placed in said cup-shaped retainer and the other end then inserted into the U-shaped retainer.

20. A front-wheel drive motor vehicle as set forth in claim 19 wherein the lock pin is threadable into a threaded opening in the front frame for locking said spindle pin in position.

21. A front-wheel drive vehicle as set forth in claim 20 wherein said lock pin has finger grip means thereon to facilitate turning the lock pin, said finger grip means having at least one opening therein for receiving a security cable therethrough for preventing the lock pin from being unthreaded from said threaded opening.

22. A front-wheel drive motor vehicle as set forth in claim 18 wherein said front frame is a fork frame comprising a pair of upright generally parallel tubular fork frame members connected by a cross-frame member, said retainers being on said cross-frame member.

23. A front-wheel drive motor vehicle comprising a front frame assembly including a front frame extending up at the front of the vehicle, a front wheel mounted at the lower end of the front frame, and steering means at the upper end of the front frame, a power drive assembly mounted on the front frame for driving the front wheel to power the vehicle, a rear frame assembly including a rear frame extending rearwardly from the front frame, a rear wheel mounted at the rearward end of the rear frame, and a rider's platform on the rear frame forward of the rear wheel at an elevation and position adapted to permit a rider to stand on the platform while grasping said steering means, a quick-release coupling detachably connecting the front and rear frames and permitting the front frame to be pivoted relative to the rear frame for steering the vehicle, and a kickstand pivoted at the lower end of the front frame for swinging between an up position when the vehicle is in use and a down position in which it is adapted stably to support the vehicle in an upright position when the vehicle is not in use, said kickstand in its up position being adapted stably to support the front frame assembly in an upright position when the front frame assembly is detached from the rear frame assembly.

24. A front-wheel drive motor vehicle comprising a front frame assembly including a front frame extending up at the front of the vehicle, a front wheel mounted at the lower end of the front frame, and steering means at the upper end of the front frame, a power drive assembly mounted on the front frame for driving the front wheel to power the vehicle, and a rear frame assembly including a rear frame extending rearwardly from the front frame, a rear wheel mounted at the rearward end of the rear frame, and a rider's platform on the rear frame forward of the rear wheel at an elevation and position adapted to permit a rider to stand on the platform while grasping said steering means, said power drive assembly comprising an engine, a first clutch driven by the output of the engine, a second clutch driven by the output of the first clutch, and drive means connecting the output of the second clutch and the front wheel of the vehicle, said second clutch being a one-way clutch adapted for transmitting a torsional force in one direction to drive the front wheel to propel the vehicle forward but not in the opposite direction thereby to permit freewheeling of the front wheel.

25. A front-wheel drive motor vehicle as set forth in claim 24 wherein said front and rear frames are formed from lengths of tubular metal, the overall weight of said vehicle being about 60 pounds or less.

26. A front-wheel drive motor vehicle as set forth in claim 25 wherein said front frame is a fork frame comprising a pair of generally parallel upright fork frame members of tubular metal having upper ends bent to extend laterally outwardly at opposite sides of the vehicle to form said steering means, said rear frame comprising a rear frame member of bent tubular metal having a first reach sloping rearwardly and downwardly from the front fork frame and a second reach extending generally horizontally rearwardly toward said rear wheel, said platform being pivoted on the generally horizontal reach for actuating a rear wheel brake.

* * * * *